US012657682B2

(12) United States Patent
Li et al.

(10) Patent No.: US 12,657,682 B2
(45) Date of Patent: Jun. 16, 2026

---

(54) VISION INSPECTION SYSTEMS AND METHODS FOR LASER WELDS

(71) Applicant: GM GLOBAL TECHNOLOGY OPERATIONS LLC, Detroit, MI (US)

(72) Inventors: Guangze Li, Novi, MI (US); Hui-ping Wang, Troy, MI (US); Christopher Warmack, Goodrich, MI (US); Robert S. Bucchi, Lake Orion, MI (US); Robert T. Szymanski, St. Clair Township, MI (US); Paolo A. Novelletto, LaSalle (CA); Baixuan Yang, Canton, MI (US); Weitian Zhou, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 935 days.

(21) Appl. No.: 17/944,543

(22) Filed: Sep. 14, 2022

(65) Prior Publication Data

US 2024/0087103 A1     Mar. 14, 2024

(51) Int. Cl.
  *G06T 7/00*       (2017.01)
  *B23K 26/21*      (2014.01)
  *G01N 21/88*      (2006.01)

(52) U.S. Cl.
  CPC ............ *G06T 7/0004* (2013.01); *B23K 26/21* (2015.10); *G01N 21/8803* (2013.01); *G06T 2207/30164* (2013.01)

(58) Field of Classification Search
  CPC ........... G01N 2021/8416; G01N 21/84; G01N 2291/106; G01N 29/262; G01N 29/28;
G01N 2291/044; G01N 29/043; G01N 29/0645; G01N 2291/267; G01N 21/45; G01N 2291/2638; G01N 29/265; G01N 21/88; G01N 21/8806; G01N 25/72; G01N 29/11; G01N 21/8851; G01N 21/95; G01N 2021/8438; G01N 21/8422; G01N 2291/2672; G01N 2291/2675; G01N 29/04; G01N 21/958; G01N 33/207; G01N 2021/8838; G01N 2021/8845;

(Continued)

(56) References Cited

U.S. PATENT DOCUMENTS 5,304,774  A  *  4/1994  Durheim .............. B23K 26/032
                                                  219/121.63
10,520,301  B1 *  12/2019  Tobiason .............. G06T 1/0014
(Continued)

FOREIGN PATENT DOCUMENTS

CN            1782659  B   *  10/2010
CN          108593659  A   *  9/2018   ......... G01N 21/8851
(Continued)

*Primary Examiner* — Michael P Stafira

(57)         ABSTRACT

A vision inspection system for laser welds includes a scanning station to support a workpiece including one or more laser welds. A vision sensing assembly includes a top surface, a bottom surface, side surfaces, a light source, and a sensor. The light source illuminates the workpiece while the sensor generates an image of the one or more laser welds of the workpiece. A shield is arranged around the top surface and the side surfaces of the vision sensing assembly. The bottom surface of the vision sensing assembly is arranged above a lower edge of the shield by a first predetermined distance.

20 Claims, 4 Drawing Sheets

(58) Field of Classification Search

CPC ... G01N 2021/8867; G01N 2021/8887; G01N 21/07; G01N 21/8803; G01N 21/95684; G01N 2203/0694; G01N 2291/0289; G01N 2291/0422; G01N 2291/048; G01N 2291/057; G01N 2291/102; G01N 2291/2677; G01N 29/069; G01N 29/07; G01N 29/221; G01N 29/226; G01N 29/2487; G01N 29/2493; G01N 29/34; G01N 29/4427; G01N 9/4445; G01N 29/48; G01N 3/08; G01N 15/1433; G01N 15/1434; G01N 2015/1006; G01N 2021/0112; G01N 2021/1787; G01N 2021/3137; G01N 2021/3177; G01N 2021/4711; G01N 2021/4735; G01N 2021/8893; G01N 21/01; G01N 21/171; G01N 21/253; G01N 21/31; G01N 21/3563; G01N 21/41; G01N 21/4133; G01N 21/447; G01N 21/4738; G01N 21/49; G01N 21/55; G01N 21/71; G01N 21/85; G01N 21/894; G01N 21/9515; G01N 21/954; G01N 2201/061; G01N 2223/629; G01N 29/22; G01N 29/24; G01N 29/26; G01N 33/54366; G01N 33/54389; G01N 35/00069; G01N 2021/177; G01N 2035/00673; G01N 21/78; G01N 2201/0256; G01N 2201/0415; G01N 2203/0296; G01N 27/07; G01N 27/20; G01N 27/3273; G01N 27/3274; G01N 27/4062; G01N 27/4067; G01N 27/4073; G01N 27/4078; G01N 27/4163; G01N 27/4175; G01N 29/225; G01N 33/66; G01N 35/00663; G06T 7/0004; G06T 2207/20081; G06T 2207/30152; G06T 2207/30164; G06T 7/001; G06T 2207/300108; G06T 2207/10028; G06T 2207/20084; G06T 7/0002; G06T 2200/24; G06T 2200/28; G06T 2207/10024; G06T 2207/10048; G06T 2207/10132; G06T 2207/15152; G06T 2207/20092; G06T 2207/30136; G06T 7/11; G06T 7/521; G06T 7/62; G06T 11/00; G06T 19/006; G06T 2207/30204; G06T 7/20; G06T 7/55; G06T 7/75; G06T 2200/04; G06T 5/90; G06T 7/00; G06T 7/0008; G06T 7/13; G06T 7/70; B23K 26/032; B23K 31/125; B23K 26/03; B23K 26/21; B23K 26/242; B23K 26/20; B23K 26/32; B23K 26/348; B23K 9/0956; B23K 2103/04; B23K 15/0013; B23K 2103/52; B23K 26/382; B23K 26/702; B23K 26/0838; B23K 26/361; B23K 2101/10; B23K 26/342; B23K 15/02; B23K 15/08; B23K 15/085; B23K 2101/001; B23K 2103/42; B23K 26/362; B23K 26/24; B23K 2103/10; B23K 26/042; B23K 26/082; B23K 2103/26; B23K 26/34; B23K 2101/06; B23K 2101/38; B23K 2103/50; B23K 26/0884; B23K 35/0244; B23K 37/0531; B23K 2103/12; B23K 26/0622; B23K 31/006; B23K 2101/34; B23K 26/211; B23K 26/26; B23K 37/0276; B23K 9/0284; B23K 2101/006; B23K 26/02; B23K 26/08; B23K 26/0846; B23K 26/38; B23K 37/003; B23K 9/0282; B23K 9/1274; B23K 2101/16; B23K 26/0096; B23K 26/0626; B23K 26/123; B23K 26/18; B23K 26/22; B23K 26/244; B23K 26/262; B23K 9/173; B23K 2101/18; B23K 2103/166; B23K 26/00; B23K 26/0006; B23K 26/0861; B23K 26/144; B23K 26/322; B23K 26/40; B23K 35/0255; B23K 35/36; B23K 37/0282; B23K 37/053; B23K 9/0953; B23K 9/23; B23K 2103/18; B23K 2103/20; B23K 26/0034; B23K 26/04; B23K 26/0648; B23K 26/0661; B23K 26/0689; B23K 26/14; B23K 26/28; B23K 26/323; B23K 26/389; B23K 35/0261; B23K 35/3033; B23K 35/304; B23K 35/3053; B23K 35/3066; B23K 35/3086; B23K 9/32; B23K 10/006; B23K 15/0046; B23K 15/0086; B23K 15/0096; B23K 2101/40; B23K 26/0826; B23K 26/60; B23K 9/0286; B23K 11/08; B23K 11/115; B23K 11/16; B23K 20/122; B23K 20/227; B23K 20/2336; B23K 2101/14; B23K 2101/36; B23K 2103/05; B23K 2103/08; B23K 2103/54; B23K 26/0344; B23K 26/035; B23K 26/06; B23K 26/0643; B23K 26/106; B23K 26/324; B23K 9/127; B23K 1/00; B23K 1/0012; B23K 1/0056; B23K 11/002; B23K 11/0026; B23K 11/066; B23K 11/252; B23K 2103/02; B23K 26/044; B23K 26/0665; B23K 26/1224; B23K 26/16; B23K 26/282; B23K 26/70; B23K 28/02; B23K 31/00; B23K 31/02; B23K 31/12; B23K 37/0533; B23K 1/004; B23K 20/02; B23K 20/124; B23K 2101/02; B23K 2101/04; B23K 2101/26; B23K 2101/28; B23K 2101/32; B23K 29/0096; B23K 26/0342; B23K 26/064; B23K 26/067; B23K 26/073; B23K 26/10; B23K 26/103; B23K 26/125; B23K 26/127; B23K 26/142; B23K 26/206; B23K 26/36; B23K 26/705; B23K 3/08; B23K 33/00; B23K 33/006; B23K 37/00; B23K 37/0217; B23K 37/0252; B23K 37/027; B23K 37/0435; B23K 37/08; B23K 9/02; B23K 9/028; B23K 9/0288; B23K 9/1056; B23K 9/125; B23K 9/126; B23K 9/167; B23K 9/324

See application file for complete search history.

(56) References Cited

U.S. PATENT DOCUMENTS

| | | | | |
|---|---|---|---|---|
| 2021/0001423 A1* | 1/2021 | Boillot | | G06T 7/80 |
| 2021/0178514 A1* | 6/2021 | Yasuoka | | B23K 26/244 |

FOREIGN PATENT DOCUMENTS

| | | | | | |
|---|---|---|---|---|---|
| CN | 108890135 | A | * | 11/2018 | B23K 26/24 |
| CN | 106141435 | B | * | 7/2019 | B23K 26/348 |
| CN | 110480127 | A | * | 11/2019 | B23K 9/1274 |
| CN | 113506236 | A | * | 10/2021 | B23K 26/21 |
| CN | 114453708 | A | * | 5/2022 | B23K 9/32 |
| KR | 200305166 | Y1 | * | 2/2003 | G01B 21/04 |

(56) References Cited

FOREIGN PATENT DOCUMENTS

| KR | 20150003607 A * | 1/2015 | ........... B23K 31/125 |
| WO | WO-2021127764 A1 * | 7/2021 | ........... B25J 9/1697 |
| WO | WO-2021177435 A1 * | 9/2021 | ............. B23K 31/02 |

* cited by examiner

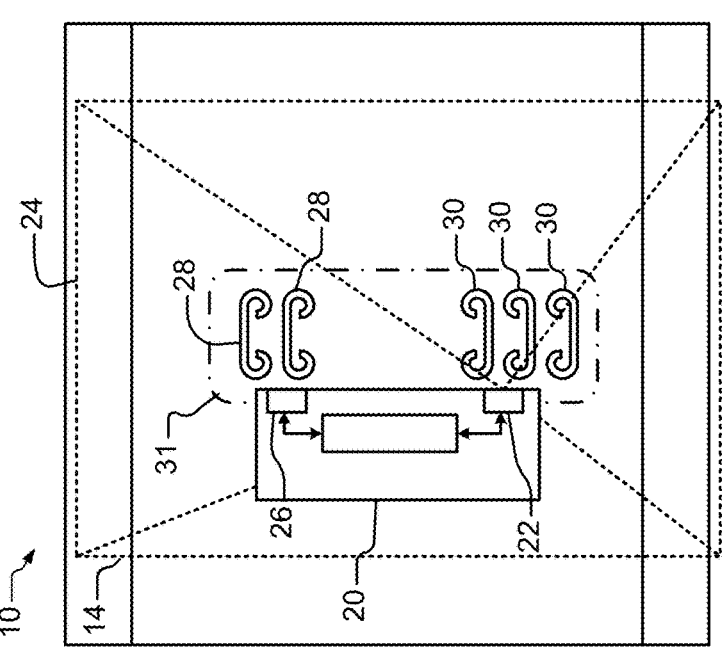
FIG.1B
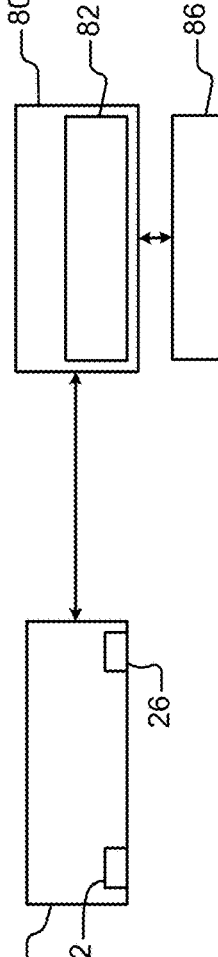
FIG.1C
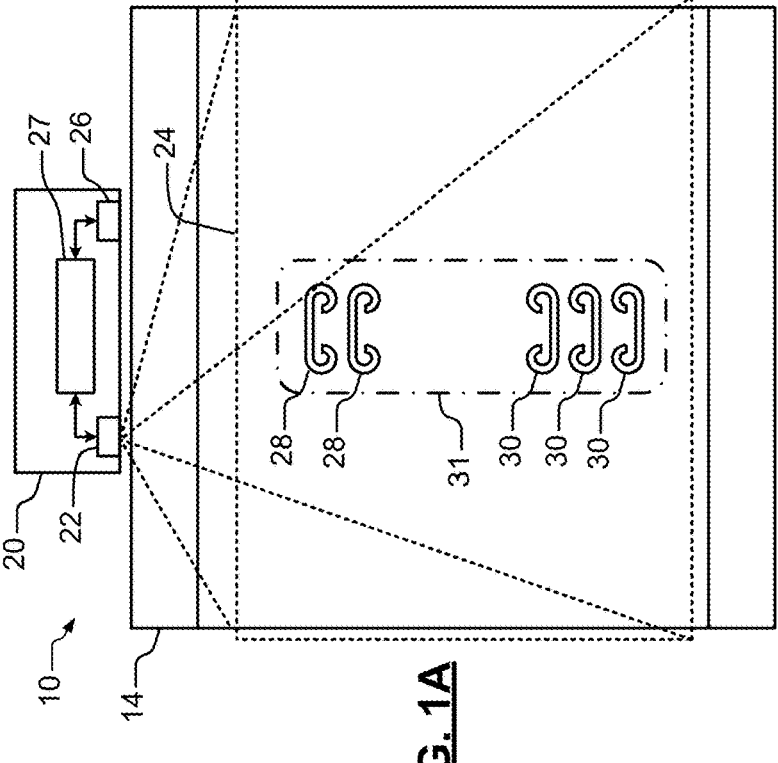
FIG. 1A

VISION INSPECTION SYSTEMS AND METHODS FOR LASER WELDS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to laser welding, and more particularly to systems and methods for improving the accuracy of vision inspection systems for laser welds.

Laser welds can be used to join two or more components in automotive or other applications. Laser welds can have a widths that are as narrow as 1 mm and concavity as deep as 3 mm-6 mm in automotive and other applications. The weld dimensions are difficult to analyze using vision-based weld inspection systems due to a shadowing effect that occurs in weld areas with deep concavity.

SUMMARY

A vision inspection system for laser welds includes a scanning station to support a workpiece including one or more laser welds. A vision sensing assembly includes a top surface, a bottom surface, side surfaces, a light source, and a sensor. The light source illuminates the workpiece while the sensor generates an image of the one or more laser welds of the workpiece. A shield is arranged around the top surface and the side surfaces of the vision sensing assembly. The bottom surface of the vision sensing assembly is arranged above a lower edge of the shield by a first predetermined distance.

In other features, the first predetermined distance is greater than or equal to 2 inches. A repairing station supports a workpiece requiring repairs. The repairing station is located below the scanning station by a second predetermined distance. The second predetermined distance is greater than or equal to 1 inch. A robot includes an end effector to deliver the workpiece to the scanning station. The robot is held stationary for a predetermined period prior to generating the image.

In other features, a mount supports the vision sensing assembly. The mount is made of a material selected from a group consisting of aluminum and copper. A light shield is arranged between the light source and the workpiece to reduce dimensions of projected light around the one or more laser welds of the workpiece.

In other features, reduced dimensions of the projected light define a predetermined buffer zone around a zone including normal production variations in a location of the one or more laser welds.

In other features, the predetermined buffer zone is greater than or equal to 10 mm. The light source and the sensor generate M images using M different exposure periods, where M is an integer greater than one. A controller includes an image processing module configured to combine the M images into a composite image.

A method for inspecting laser welds includes using a scanning station to support a workpiece including one or more laser welds; arranging a vision sensing assembly including a top surface, a bottom surface, side surfaces, a light source, and a sensor above the workpiece; arranging a shield around the top surface and the side surfaces of the vision sensing assembly. The bottom surface of the vision sensing assembly is arranged above a lower edge of the shield by a first predetermined distance. The method includes illuminating the workpiece while the sensor generates an image of the one or more laser welds of the workpiece.

In other features, the first predetermined distance is greater than or equal to 2 inches.

In other features, the method includes locating a repairing station, configured to support a workpiece requiring repairs, below the scanning station by a second predetermined distance, wherein the second predetermined distance is greater than or equal to 1 inch.

In other features, the method includes delivering the workpiece to the scanning station using a robot including an end effector, wherein the robot is held stationary for a predetermined period prior to generating the image. The method includes using a mount to support the vision sensing assembly, wherein the mount is made of a material selected from a group consisting of aluminum and copper. The method includes arranging a light shield including an aperture between the light source and the workpiece to reduce dimensions of light projected around the one or more laser welds of the workpiece.

In other features, the reduced dimensions of the projected light define a predetermined buffer zone around a zone including normal production variations in a location of the one or more laser welds.

In other features, the method includes generating M images using M different exposure periods, where M is an integer greater than one; and combining the M images into a composite image.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1A is a plan view illustrating an example of a parallel orientation of a vision sensor relative to a workpiece during inspection;

FIG. 1B is a plan view illustrating an example of a perpendicular orientation of a vision sensor relative to a workpiece during inspection according to the present disclosure;

FIG. 1C is a functional block diagram of a vision sensor, a controller and a robot or conveyor according to the present disclosure;

In the drawings, reference numbers may be reused to identify similar and/or identical elements.

DETAILED DESCRIPTION

Figures 2A, 2B, 2C, 3:
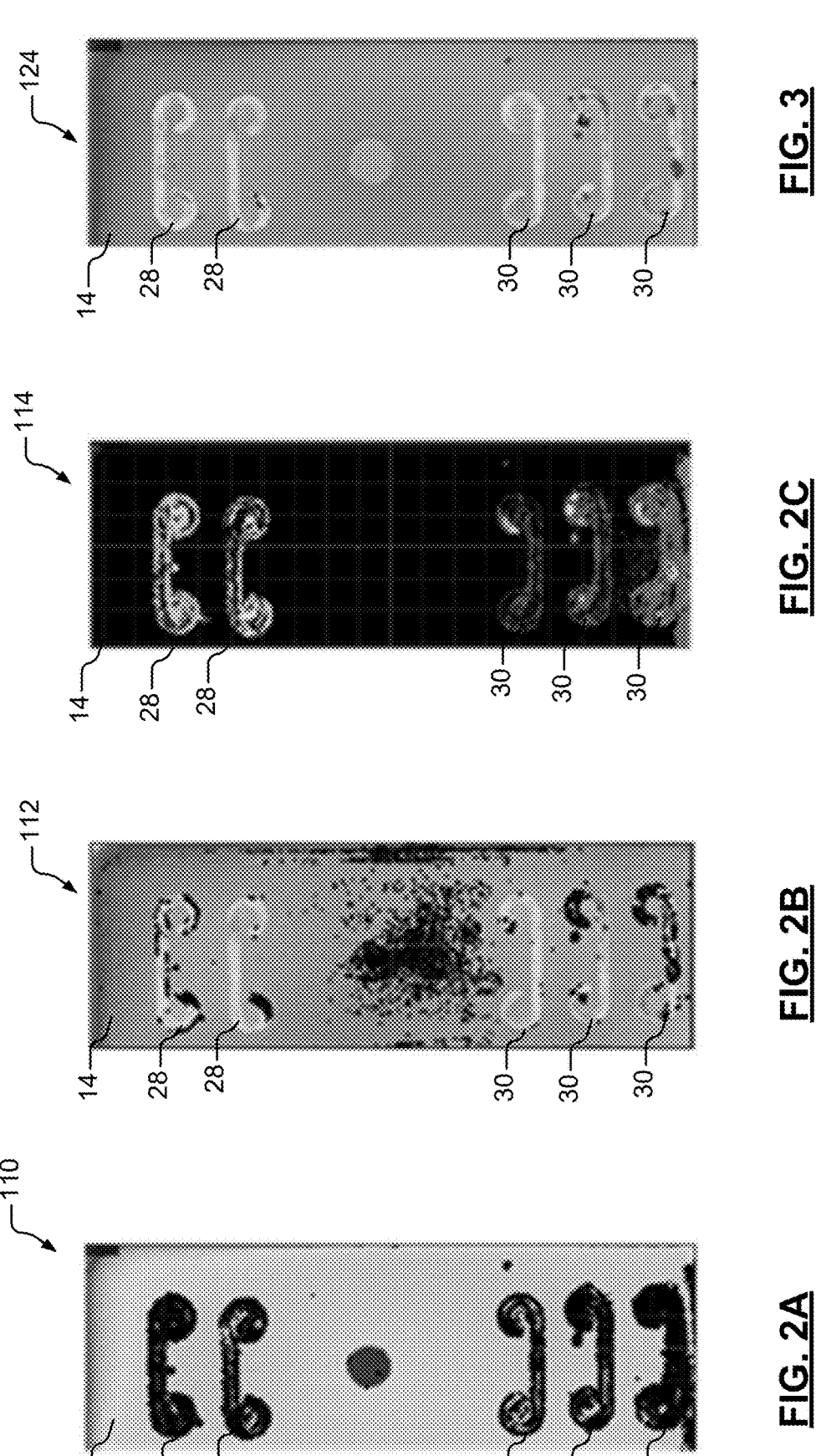
FIGS. 2A to 2C are examples of images taken during different exposure periods according to the present disclosure.
FIG. 3 is an example of a composite image based on the images taken in FIGS. 2A to 2C during different exposure periods according to the present disclosure.

While the foregoing description relates to a vision inspection system for laser welds in automotive applications, the vision inspection system can be used for laser welds in non-automotive applications.

The present disclosure relates to a vision inspection system for laser welds including a vision sensing assembly, sensor mounting devices, and robots or conveyers for handling the laser welded workpiece.

Referring now to FIGS. 1A and 1B, a vision sensing assembly 20 including a light source 22, a sensor 26, and controller 27 is arranged above a workpiece 14. The workpiece 14 includes one or more laser welds 28 and 30 that are located in a production weld area 31 of the workpiece 14. In some examples, the light source 22 includes a scanning laser. The controller 27 is configured to cause the light source 22 to illuminate a field of view while the sensor 26 generates an image. In some examples, the controller 27 or another controller generates images using two or more exposure periods and generates a composite image.

In some examples, the laser welds 28 and 30 are arranged in a vertical column. In FIG. 1A, the vision sensing assembly 20 is arranged parallel relative to the length direction of laser welds 28 and 30 of the workpiece 14 during inspection. As used herein, parallel or perpendicular orientation is based on the orientation of single laser welds. For example, in FIG. 1A, the length direction of the laser welds is horizontal and the direction of the sensor 26 is also horizontal (e.g., parallel orientation). In contrast in FIG. 1B, the length direction of the laser weld is horizontal but the sensor is vertical (e.g., perpendicular orientation).

The vision sensing assembly 20 has a rectangular sensor field of view. One side of the sensor field of view (in this case horizontal direction) is longer than the other side of the field of view (in this case vertical). Shadowing is usually caused by the concavity or holes in the laser welds 28 and 30. Positioning the vision sensing assembly 20 parallel to the orientation of the laser welds 28 and 30 to be inspected reduces shadowing during scanning.

In FIG. 1B, the vision sensing assembly 20 is arranged perpendicular relative to the length direction of the laser welds 28 and 30 of the workpiece 14 during inspection. One side of the sensor field of view (in this case vertical direction) is longer than the other side of the field of view (in this case horizontal). In this example, shadowing may occur in the concavity in the welds 28 and 30 due to the orientation of the vision sensing assembly 20 relative to the laser welds 28 and 30 on the workpiece 14.

Referring now to FIG. 1C, a controller 80 (and/or controller 27) may be used to control the vision inspection system. The controller 80 can be the same as the controller 27 or an additional controller can be used. The controller 80 (and/or the controller 27) includes an image processing module 82 to control the vision sensing assembly 20 and to control a robot or conveyor to deliver a workpiece to a scanning station and to remove the workpiece from the scanning station. In some examples, multiple images are generated for each workpiece and the images are combined into a composite image. The image processing module 82 analyzes the composite image and determines whether or not the one or more laser welds meet predetermined criteria.

Referring now to FIGS. 2A to 3, multiple images 110, 112 and 114 of the workpiece with laser welds 28 and 30 are generated using different exposure periods. For example, the images 110, 112 and 114 in FIGS. 2A to 2C use different exposure periods (in this case, increasing exposure periods). Using multiple images with different exposure periods allows each image to capture information at specific depths or surface of specific reflectivity in a region of interest (ROI).

For example only, the different exposure periods of the images 110, 112 and 114 includes exposure periods A, B, and C, where A, B and C correspond to the different exposure periods. For example, the different exposure periods may include 325 μs, 3250 μs, and 32500 μs, respectively, although other exposure periods can be used. Using multiple images at different exposure periods provides an improved representation of the morphology in the ROI. Using multiple images with different exposure periods avoids the use of data filling/filter functions in software of the vision sensing assembly 210, which can cause artificial noise. In FIG. 3, a composite image can be formed by combining the multiple images with different exposure periods. Alternately, the images 110, 112 and 114 can be analyzed separately.

Figures 4A, 4B:
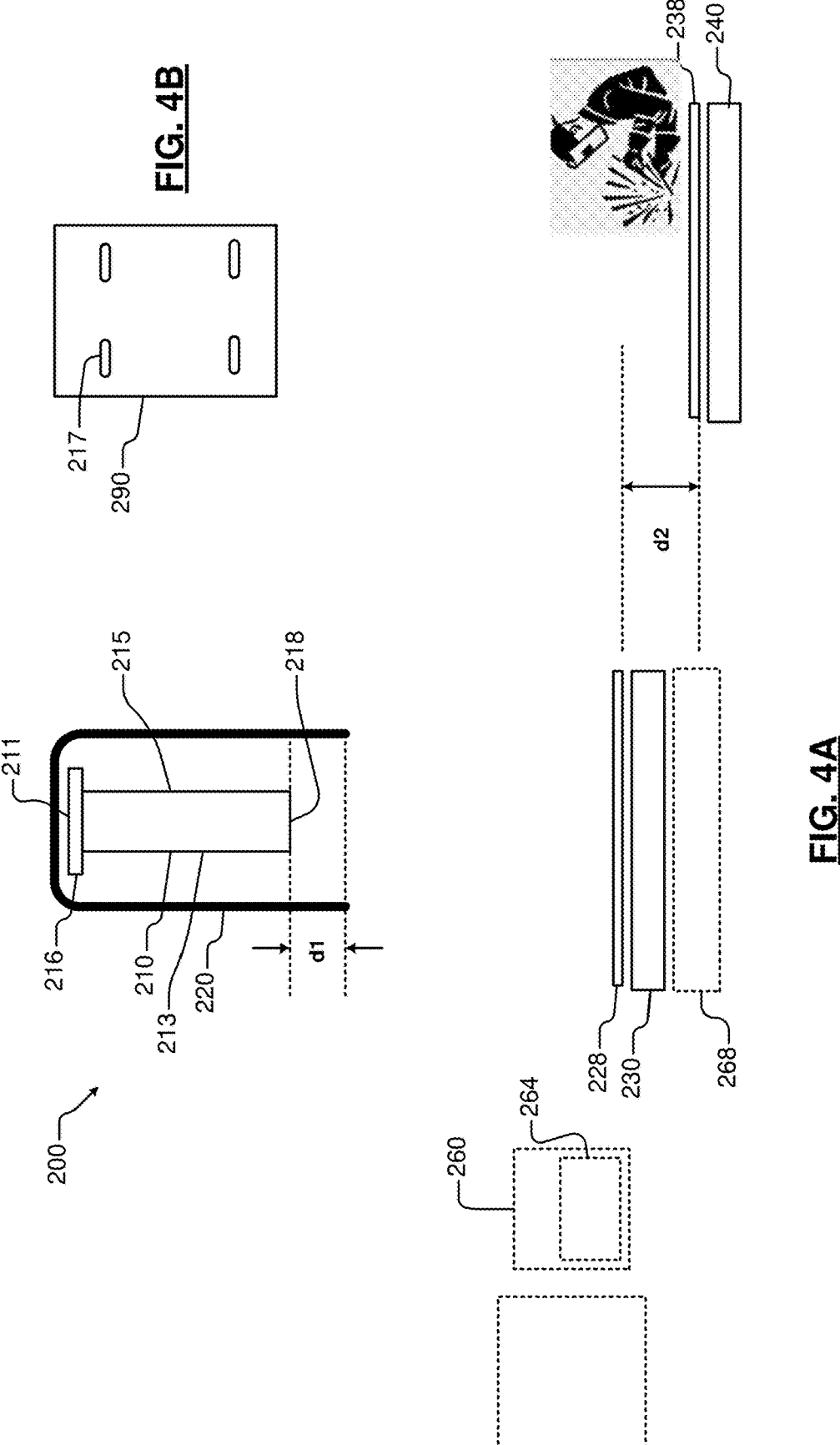
FIG. 4A is a functional block diagram of an example of a vision inspection system including a scanning station, a vision sensor, a shield arranged around the vision sensor, and a repair station according to the present disclosure.
FIG. 4B is a plan view of a mount and/or fixture including elongate mounting slots according to the present disclosure.

Referring now to FIGS. 4A and 4B, a vision inspection system 200 for inspecting laser welds on the workpiece 14 is shown. In some examples, the workpiece 208 is delivered to a scanning station 230 by a robot 260 including an end effector 264 or conveyor 268. A vision sensing assembly 210 is arranged above the scanning station 230. The vision sensing assembly 210 is attached to a mount 216 that is connected to one or more stationary posts/fixtures (not shown). In some examples, the mount 216 and/or the one or more stationary posts/fixtures include elongated slots 217 to allow fine adjustment of a position the vision sensing assembly 210 according to the region of interest. A shield 220 is arranged around the vision sensing assembly 210. In some examples, the shield 220 includes slots (not shown) to allow connection of the mount 216 to the one or more stationary posts/fixtures. A repair station 240 is located adjacent to the scanning station 230.

The vision sensing assembly 210 and the shield 220 are mounted at a predetermined height relative to the repair station 240. In some examples, the workpiece 228 to be inspected at the scanning station 230 is positioned a predetermined distance d2 above a position of a workpiece 238 to be repaired at the repair station 240. In some examples, the distance d2 is greater than or equal to 1 inch. Using this approach avoids light contamination during the repair operation, which typically involves arc welding that generates light noise that may adversely impact visual inspection of the workpiece 228.

The vision sensing assembly 210 and/or the shield 220 are mounted on one or more stationary fixtures (FIG. 4A). The shield 220 covers the vision sensing assembly 210 around a top surface 211 and side surfaces 213, 215 thereof. In some examples, a bottom of the vision sensing assembly 210 is mounted greater than or equal to a predetermined distance d1 above a lower edge of the shield 220. This arrangement provides a buffer zone on all sides of the vision sensing assembly 210 (including the bottom surface 218) to improve protection from light pollution, dust and/or impact. In some examples, d1 is equal to 2 inches, although other values may be used.

The vision sensing assembly 210 is mounted on a side of the vision sensing assembly 210 where cooling is required. In some examples, the mount 216 is made of a heat dissipating material such as copper and/or aluminum (Al) to help dissipate heat generated during operation of the vision sensing assembly 210.

In an example shown in FIG. 4B, the mount and/or the fixture (identified at 290) include elongated slots that are used to mount the vision sensing assembly 210 and/or the shield 220 to enable flexible adjustment of the vision sensing assembly 210 and/or the shield 220 during system fine tuning.

Figure 5B:
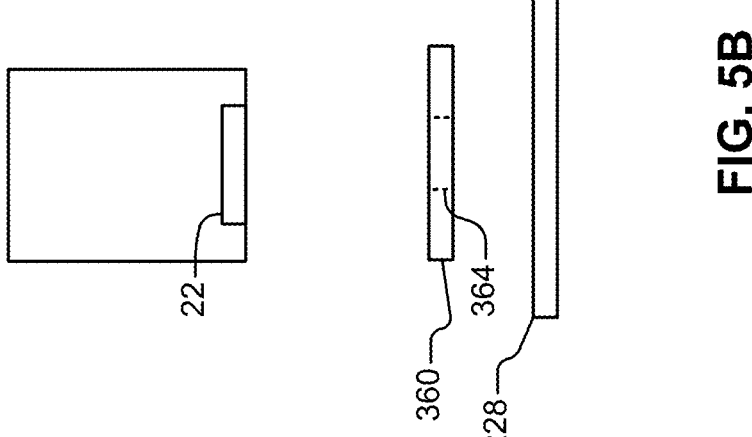
FIG. 5B is a side view of an example of a light shield with a reduced aperture arranged between the vision sensor and the workpiece according to the present disclosure.
Figure 5A:
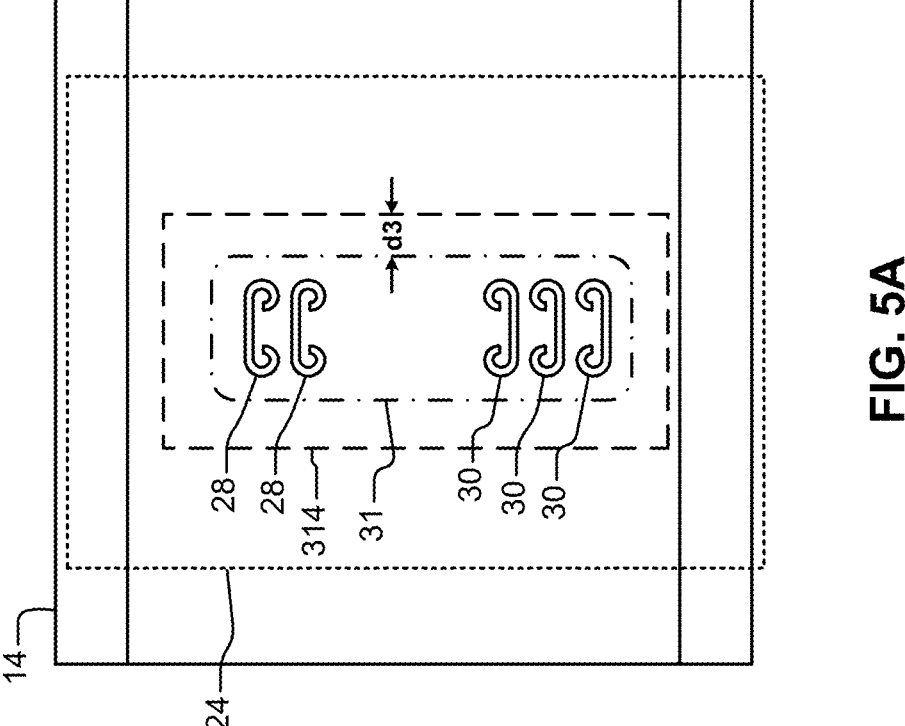
FIG. 5A is a plan view illustrating an example of a field of view of a vision sensor relative to a production weld area on a workpiece according to the present disclosure.

Referring now to FIG. 5, a plan view illustrates a field of view 314 of the vision sensing assembly 210 relative to the production weld area 31 on a workpiece 14. The dimensions of the projected light of the light source are adjusted to cover the region of interests with consideration of normal production variations of weld locations and 10 mm buffer zone.

The dimension of the projected light is minimized so as not to cover neighboring highly reflective surfaces. In some examples, a light shield 360 including an aperture 364 arranged between the light source and the workpiece is used to block an undesired light area and achieve the desired dimension of the projected light. The ROI (including one or more laser welds) is defined to exclude the highly reflective surface of the workpiece 228. This avoids the usage of an inter-reflective function in the software of the vision sensor, which also creates artificial noise.

In some examples, the robot 260 or the linear conveyor are used to position the workpiece at the scanning station. Operation of the robot 260 or the conveyor 268 are adjusted to suppress vibration of the workpiece 228 while scanning is performed to ensure data integrity. In some examples, the conveyor 268 is used to move the workpiece 228 for reduced part vibration.

In some examples, the robot 260 or the conveyor 268 are stationary during scanning. In some examples, the robot 260 with the end effector 264 is used to position the workpiece 228 on the scanning station 230. In some examples, scanning is performed a predetermined period after the robot 260 stops to eliminate part vibration and achieve consistent weld detection.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vision inspection system for laser welds, comprising:
a scanning station to support a workpiece including one or more laser welds;
a vision sensing assembly positioned relative to the scanning station and including a top surface, a bottom surface, side surfaces extending between the top surface and the bottom surface, a light source, and a sensor,
wherein the light source illuminates a region of interest of the workpiece coinciding with the one or more laser welds while the sensor generates an M images of the region of interest coinciding with the one or more laser welds of the workpiece, wherein each image of the M images are generated using M different exposure periods where the M different exposure periods each correspond with differing lengths of time such that each image of the M images captures information at a specific depth or a surface of specific reflectivity according to the M different exposure periods, where M is an integer greater than one; and
a shield arranged around the top surface and the side surfaces of the vision sensing assembly,
wherein the bottom surface of the vision sensing assembly is arranged above a lower edge of the shield by a first predetermined distance such that the shield covers a buffer zone around the top surface, the bottom surface, and the side surfaces of the vision sensing assembly to protect the vision sensing assembly from light pollution, dust, and/or impact.

2. The vision inspection system of claim 1, wherein the first predetermined distance is greater than or equal to 2 inches.

3. The vision inspection system of claim 1, further comprising a repairing station adjacent to the scanning station and configured to support a repair workpiece requiring repairs, wherein the repairing station is located below the scanning station by a second predetermined distance such that the repair workpiece is disposed below the workpiece supported with the scanning station.

4. The vision inspection system of claim 3, wherein the second predetermined distance is greater than or equal to 1 inch.

5. The vision inspection system of claim 1, further comprising a robot including an end effector to deliver the workpiece to the scanning station.

6. The vision inspection system of claim 5, wherein the robot is held stationary for a predetermined period prior to generating the image.

7. The vision inspection system of claim 1, further comprising a mount supporting the vision sensing assembly, wherein the mount is made of a material selected from a group consisting of aluminum and copper.

8. The vision inspection system of claim 1, further comprising a light shield including an aperture arranged between the light source and the workpiece to block an undesired light area and provide reduced dimensions of projected light around the one or more laser welds of the workpiece.

9. The vision inspection system of claim 8, wherein reduced dimensions of the projected light define a predetermined buffer zone around a zone including normal production variations in a location of the one or more laser welds.

10. The vision inspection system of claim 9, wherein the predetermined buffer zone is greater than or equal to 10 mm.

11. The vision inspection system of claim 1, further comprising a controller including an image processing module configured to combine the M images of the one or more laser welds into a composite image, wherein the image processing module is configured to analyze the composite image to determine whether a morphology of the one or more laser welds meets a predetermined criteria.

12. A method for inspecting laser welds, comprising:
using a scanning station to support a workpiece including one or more laser welds;
arranging a vision sensing assembly including a top surface, a bottom surface, side surfaces, a light source, and a sensor above the workpiece;
arranging a shield around the top surface and the side surfaces of the vision sensing assembly,
wherein the bottom surface of the vision sensing assembly is arranged above a lower edge of the shield by a first predetermined distance;
illuminating the workpiece while the sensor generates M images of the one or more laser welds of the workpiece from one field of view of the sensor and using M different exposure periods where the M different exposure periods each correspond with differing lengths of time such that each image of the M images captures information at specific depths or surface of specific reflectivity according to the M different exposure periods, where M is an integer greater than one; and combining the M images into a composite image.

13. The method of claim 12, further comprising locating a repairing station, configured to support a workpiece requiring repairs, below the scanning station by a second predetermined distance, wherein the second predetermined distance is greater than or equal to 1 inch.

14. The method of claim 12, further comprising delivering the workpiece to the scanning station using a robot including an end effector, wherein the robot is held stationary for a predetermined period prior to generating the M images.

15. The method of claim 12, further comprising using a mount to support the vision sensing assembly, wherein the mount is made of a material selected from a group consisting of aluminum and copper.

16. The method of claim 12, further comprising arranging a light shield including an aperture between the light source and the workpiece to reduce dimensions of light projected around the one or more laser welds of the workpiece, wherein the reduced dimensions of the projected light define a predetermined buffer zone around a zone including normal production variations in a location of the one or more laser welds.

17. A vision inspection system for laser welds, comprising:

a scanning station configured to support a workpiece including one or more laser welds, wherein the one or more laser welds are configured to respectively join two or more components;

a vision sensing assembly configured to visually inspect the one or more laser welds after being welded, wherein the vision sensing assembly includes a top surface, a bottom surface, side surfaces, a light source, and a sensor, wherein the light source illuminates the workpiece while the sensor generates a plurality of images of the one or more laser welds relative to one field of view the sensor, wherein the sensor generates each image of the plurality of images using a different exposure periods where the different exposure periods each correspond with differing lengths of time such that each image of the plurality of images captures information at specific depths or surface of specific reflectivity according to the different exposure period, a controller including an image processing module configured to combine the plurality of images into a composite image and analyze the composite image to determine whether a morphology of the one or more laser welds meets a predetermined criteria; and a shield arranged around the top surface and the side surfaces of the vision sensing assembly, wherein the bottom surface of the vision sensing assembly is arranged above a lower edge of the shield by a first predetermined distance.

18. The vision inspection system according to claim 17, wherein:

the different exposure periods reduce or avoid use of data filling/filter functions and/or an inter-reflective function in software of the vision sensing assembly that causes artificial noise;

wherein one of the different exposure periods is 325 μs and one or more of the different exposure periods is greater than 325 μs; and one side of the one field of view of the sensor is longer than another side of the one field of view to reduce or avoid shadowing in the composite image occurring relative to a concavity of the one or more laser welds.

19. The vision inspection system of claim 11, wherein:

the sensor includes a singular field of view, wherein one side of the singular field of view of the sensor is longer than another side of the singular field of view to reduce or avoid shadowing in the composite image occurring relative to a concavity of the one or more laser welds;

wherein one of the M different exposure periods is 325 μs and one or more of the M different exposure periods is greater than 325 μs; and each image of the M images is taken relative to the singular field of view.

20. The method of claim 12, further comprising analyzing the composite image to determine whether a morphology of the one or more laser welds meets a predetermined criteria, wherein the different exposure periods reduce or avoid use of data filling/filter functions and/or an inter-reflective function in software of the vision sensing assembly that cause artificial noise, wherein one side of the one field of view of the sensor is longer than another side of the one field of view to reduce or avoid shadowing in the composite image occurring relative to a concavity of the one or more laser welds, wherein one of the M different exposure periods is 325 μs and one or more of the M different exposure periods is greater than 325 μs.

* * * * *